United States Patent
Schenk

(10) Patent No.: US 7,440,499 B2
(45) Date of Patent: Oct. 21, 2008

(54) FRACTIONAL SPACED EQUALIZER

(75) Inventor: Heinrich Schenk, Munich (DE)

(73) Assignee: Infineon Technologies AG, Munich (DE)

( * ) Notice: Subject to any disclaimer, the term of this patent is extended or adjusted under 35 U.S.C. 154(b) by 737 days.

(21) Appl. No.: 11/042,571

(22) Filed: Jan. 25, 2005

(65) Prior Publication Data

US 2005/0169362 A1 Aug. 4, 2005

Related U.S. Application Data

(60) Provisional application No. 60/539,937, filed on Jan. 29, 2004.

(51) Int. Cl.
*H03H 7/30* (2006.01)
*H04B 1/38* (2006.01)

(52) U.S. Cl. .................................. 375/234; 375/219

(58) Field of Classification Search ......... 375/229–234, 375/219, 222, 285, 296, 346, 316, 295; 370/276, 370/282, 286–292; 379/406.01, 406.05, 379/406.08, 406.09, 406.1; 708/313, 300, 708/322, 323

See application file for complete search history.

(56) References Cited

U.S. PATENT DOCUMENTS

| | | | | | |
|---|---|---|---|---|---|
| 4,539,675 | A | * | 9/1985 | Fisher | 370/291 |
| 4,766,589 | A | * | 8/1988 | Fisher | 370/291 |
| 5,014,263 | A | * | 5/1991 | Vairavan et al. | 370/290 |
| 2004/0258172 | A1 | * | 12/2004 | Zhang | 375/261 |
| 2005/0069028 | A1 | * | 3/2005 | Belge et al. | 375/222 |
| 2005/0243903 | A1 | * | 11/2005 | Agazzi | 375/219 |

* cited by examiner

*Primary Examiner*—Tesfaldet Bocure
(74) *Attorney, Agent, or Firm*—Jenkins, Wilson, Taylor & Hunt, P.A.

(57) ABSTRACT

Fractional Spaced Equalizer FSEQ having adjustable coefficients ci for equalizing a reception signal of a transceiver. The transceiver comprises an echo compensator EC which generates an echo compensation signal for compensating an echo signal of the transceiver. The echo compensation signal is subtracted from the reception signal equalized by the fractional spaced equalizer FSEQ by means of a subtractor and the adjustable coefficients ci of the fractional spaced equalizer FSEQ are set after a half-duplex training phase of the transceiver during which the echo compensator EC is deactivated.

18 Claims, 14 Drawing Sheets

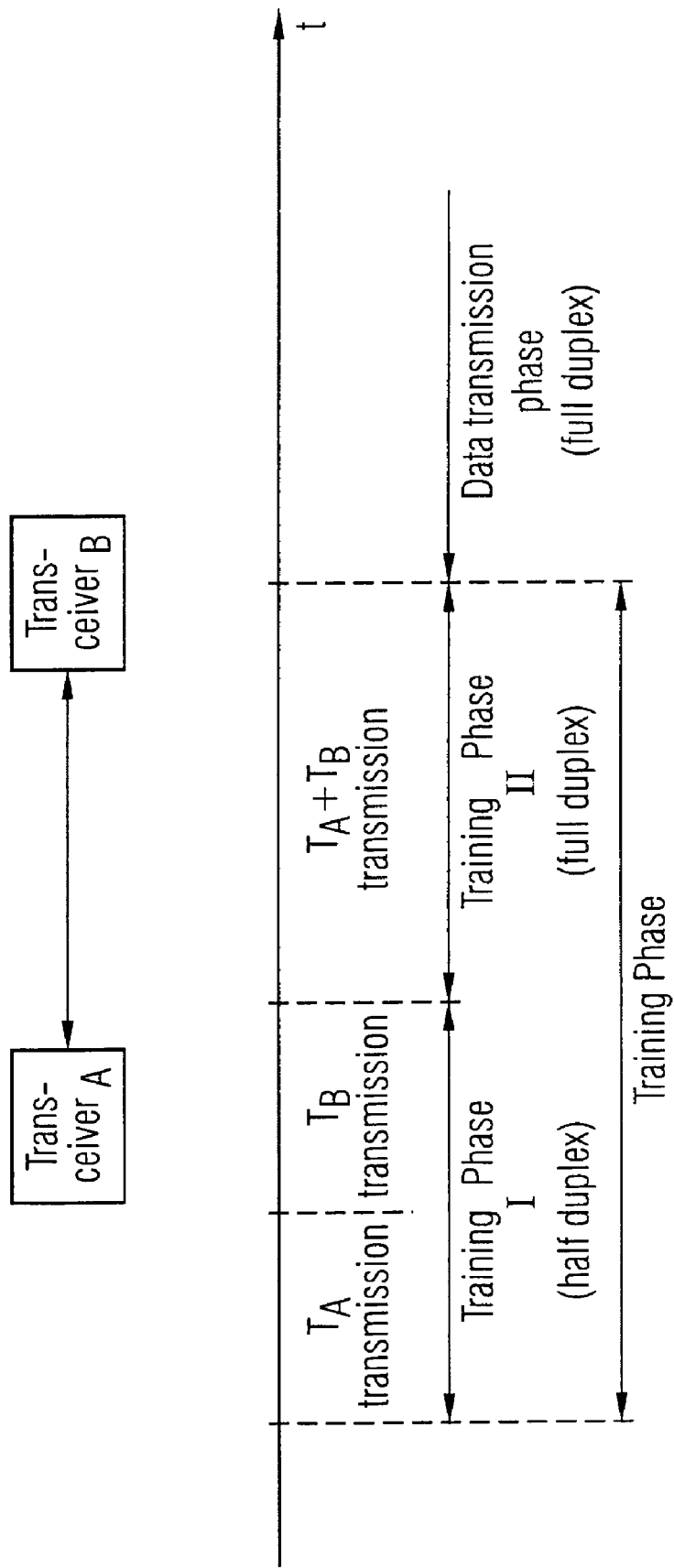

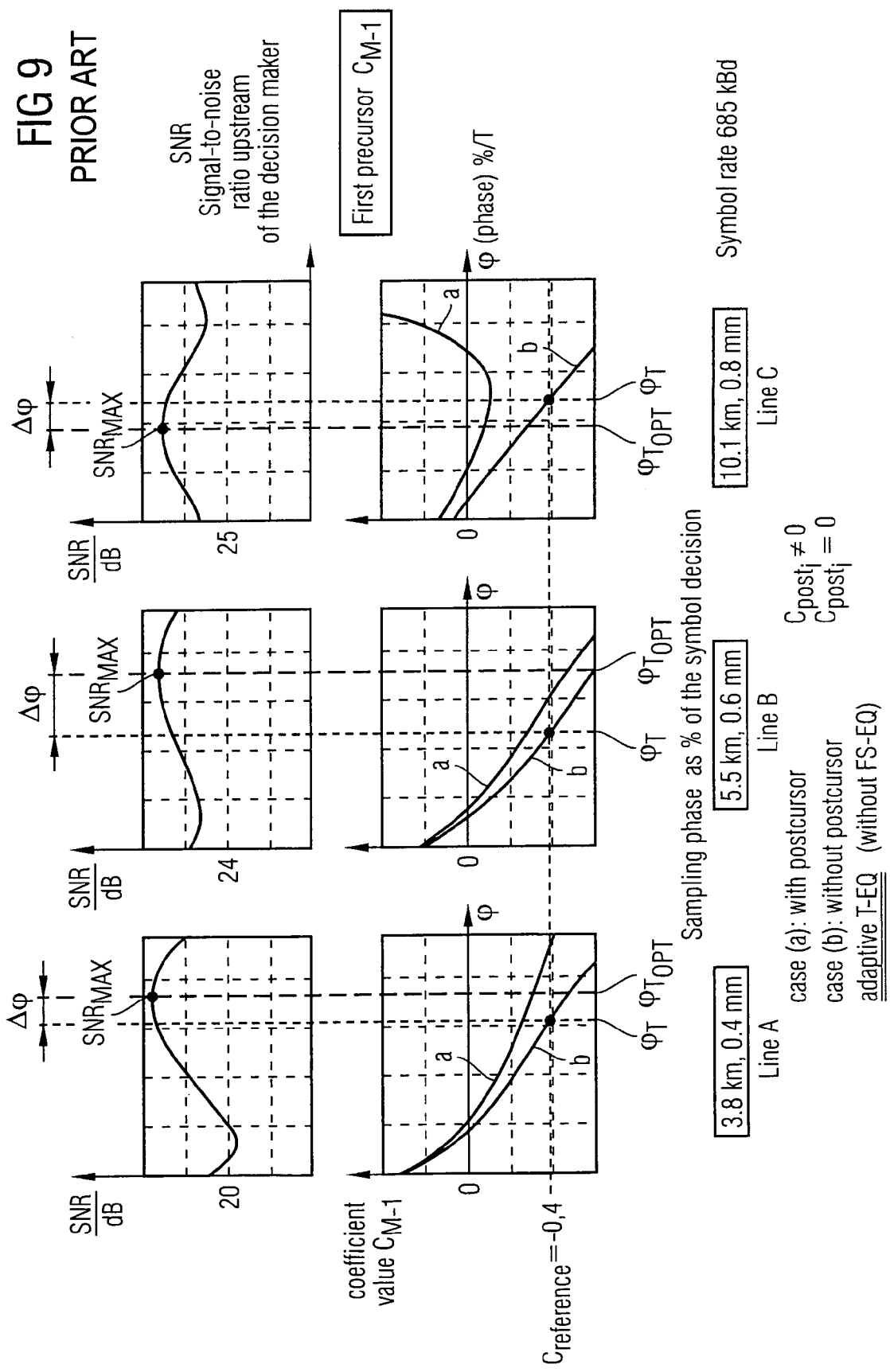

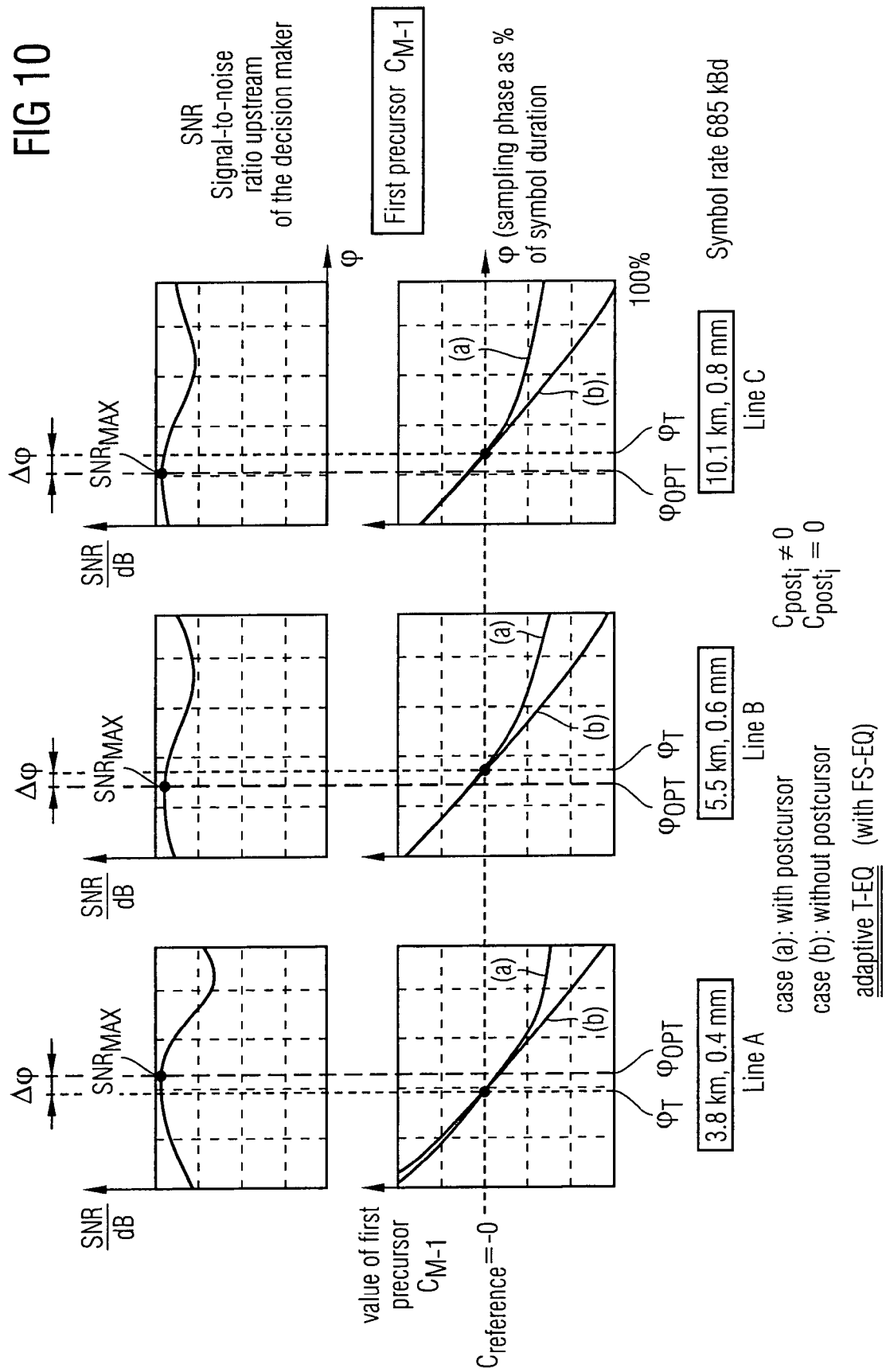

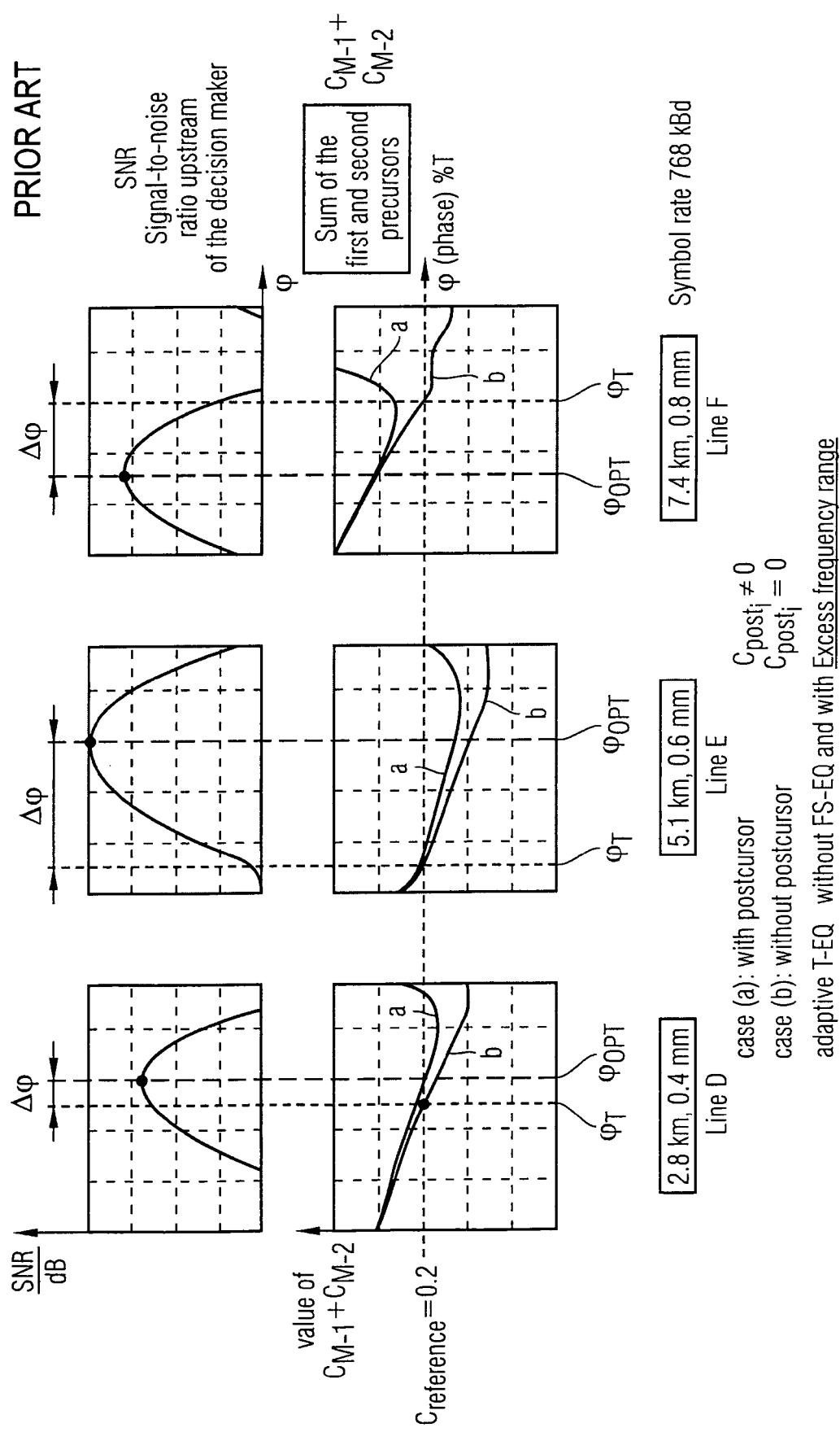

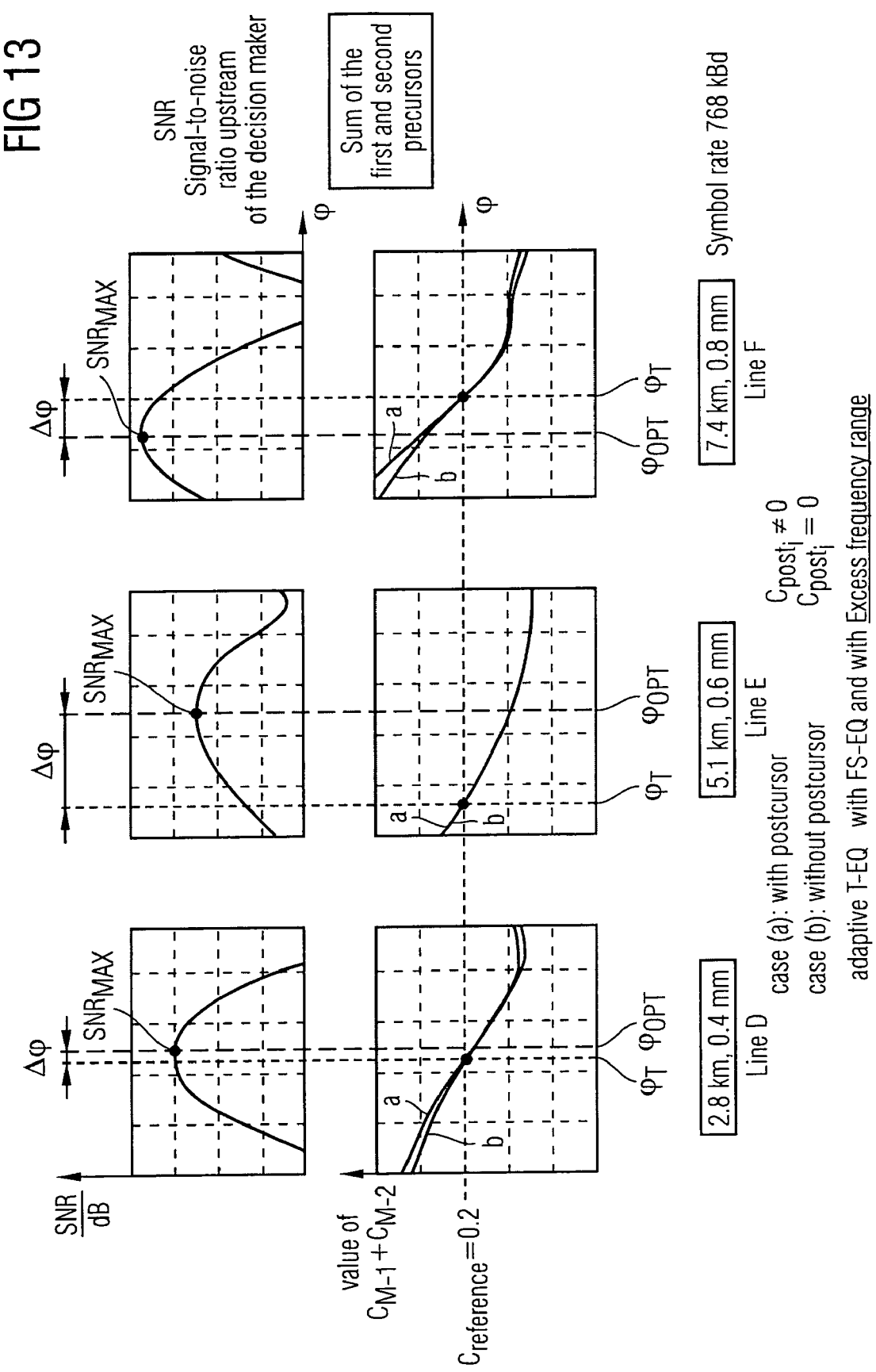

FRACTIONAL SPACED EQUALIZER

CROSS REFERENCE TO RELATED APPLICATION

This is a continuation of a provisional application Ser. No. 60/539,937 filed on Jan. 29, 2004.

BACKGROUND ART

The invention relates to a fractional spaced equalizer (FSEQ) having adjustable coefficients for equalizing a reception signal of a transceiver, and to a method for setting said coefficients of said fractional spaced equalizer.

FIG. 1 shows a data transmission system according to the state of the art. The data transmission system includes transceivers which are connected to each other via a data transmission channel formed by a transmission line. Each transceiver includes a data transmitting signal path and a data reception signal path. The data transmission line is used in the normal operation mode for the transmission of data in both directions at the same time, i.e. downstream and upstream. The transceiver receives transmission data from a data source. The transmission signal path of the transceiver comprises an encoder for encoding the transmission data and a transmission filter for filtering the encoded data. The filtered transmission data is digital-analog converted by a digital-analog converter and forwarded to a hybrid circuit. The analog transmission signal is sent to the receiving transceiver via the data transmission line and forwarded to the transceiver on the other side of the data transmission line. The receiver of each transceiver comprises an analog-digital converter, a digital reception filter and an interpolator for the interpolation of the filter reception signal. The received signal is converted from analog to digital, is filtered and afterwards sampled within the receiver. An estimated value determined by an echo compensator EC is then subtracted from the sampled received signal. The echo compensator EC is provided for compensating an echo signal caused by the transmitter within a transceiver when transmitting data via the data transmission line to the distant transceiver. A difference signal between the estimated value and the output signal of the interpolator is passed to an equalizer EQ. The output of the equalizer EQ is forwarded to a decision unit which decides on the received data symbols. The reception data output by the decision unit is output to a data sink. A timing error detection unit connected to the input and to the output of the decision unit generates a phase control criterium signal supplied to a clock recovery unit. The clock recovery unit regulates the sampling phase φ of the interpolator to synchronize the sampling frequency to a transmitter symbol frequency.

The echo compensator EC is normally formed by a digital adaptive FIR-filter wherein the coefficients of the filter are adjusted depending on the output signal of the subtractor, i.e. the difference signal between the output signal of the interpolator and the estimated value generated by the echo compensator. The output of the decision unit is normally fed-back via a decision feedback equalizing circuit to the input of the decision unit as shown in FIG. 1.

FIG. 2 shows a timing diagram of a digital reception signal as received by a conventional receiver as shown in FIG. 1. The analog-digital converter samples the received analog signal with a free-running sample frequency sample. The sample filter is filtered by the reception filter and then interpolated by the interpolator. By using a predetermined number of samples, the interpolator interpolates an interpolated value as shown in FIG. 2 wherein the sampling phase $\phi_T$ is set by the clock recovery unit in response to the phase control criterium generated by the timing error detector. The interpolated value is output by the interpolator to a subtractor which subtracts the estimated value output by the echo compensator EC. A difference signal is filtered by the equalizer EQ which is a linear equalizer normally formed by an FIR-filter. The filtered difference values form the basis for the decision performed by the decision unit which compares the received values with a threshold value to decide which value has probably been sent by the transceiver on the other side of the data transmission line.

FIG. 3 shows the digital signal at the input of the equalizer EQ and on the output of said equalizer EQ. By providing the linear equalizer EQ, it is possible to minimize the precursors of the impulse response as can be seen in FIG. 3B. However, the postcursors are not minimized. By the provision of the decision feedback equalizer, the input signal applied to the decision unit approaches almost an ideal impulse response wherein also the postcursors are minimized to zero.

FIG. 4 shows the time signal to illustrate a training phase as used in an SHDL data transmission system according to the state of the art. At the start of the setting-up of a data connection between the transceivers $T_A$ and $T_B$ a training signal is transmitted during a training phase. The training phase comprises a training phase I wherein data is transmitted in a half-duplex mode and a training phase II wherein data is ex-changed between both transceivers $T_A$, $T_B$ in a full-duplex mode. A test or training signal is defined for a period of one or two seconds depending on the data transmission rate. During training phase I the first one of the transceivers, i.e. the transceiver $T_A$, is transmitting data via the data transmission line to the distant transceiver, i.e. transceiver $T_B$, and subsequently the transceiver $T_B$ transmits data back via the data transmission line to the first transceiver $T_A$. During training phase I, the receiver at the remote end of the data transmission line receives only the transmission signal from the opposite end, but not the echo signal generated by its own transmitter. In a transceiver according to the SHDSL-standard, training phase I is not used to adjust coefficients within filters of the transceiver. The setting of the coefficients is performed during training phase II as shown in FIG. 4. After the setting of the coefficients, data is exchanged between both transceivers $T_A$, $T_B$ during a data transmission phase in a full-duplex mode.

Returning to FIG. 1 showing a transceiver according to the state of the art, the equalizer EQ can be formed by the so-called T-equalizer operating at symbol frequency $f_T$ or by a $$\frac{T}{2} - \text{equalizer}$$

operating at twice the symbol frequency. Depending on the equalizer, the symbol frequency $f_T$ or twice the symbol frequency is chosen as the sampling frequency. In both cases, the sampling phase $f_T$ is regulated, since the sampling frequency has to be synchronized to the transmitter symbol frequency.

Originally, T-equalizers have been used operating at symbol frequency $f_T$. However, T-equalizers have the disadvantage that the achievable signal-to-noise ratio SNR after the equalization process depends on the precise sampling phase $\phi_T$. There is no regulating criterium to achieve a maximum signal-to-noise ratio at an optimal sampling phase $\phi_T$. Accordingly, transceivers comprising a T-equalizer EQ show an increased bit error rate BER, since the maximum signal-to-noise ratio $SNR_{max}$ cannot be achieved. There are even poor sampling phases in which the correct synchronization of the receiver comprising a T-equalizer is completely impossible.

As a consequence, transceivers according to the state of the art have been proposed including $$\frac{T}{2} - \text{equalizers}$$

which are largely independent of the precise sampling phase. The $$\frac{T}{2} - \text{equalizer}$$

has a signal-to-noise ratio SNR which is almost constant for all sampling phases. If the $$\frac{T}{2} - \text{equalizer}$$

EQ is designed appropriately, this also generally results in a somewhat better noise response depending on the noise signal, the transmission line as well as the transmission and the reception filters. Since the signal values at the output of the equalizer EQ always have to be calculated only in time with the signal clock, the implementation complexity for the $$\frac{T}{2} - \text{equalizer}$$

corresponds approximately to the implementation complexity of the T-equalizer EQ provided that the number of coefficients are used as the basis in both cases and that a digital non-recursive filter is used in each case.

However, when using a $$\frac{T}{2} - \text{equalizer}$$

within the transceiver, the digital input values supplied to that equalizer have to be provided at twice the sampling frequency. Accordingly, all circuits which are arranged upstream of the $$\frac{T}{2} - \text{equalizer}$$

EQ have to provide digital values at twice the sampling frequency increasing the complexity of all circuits which are arranged upstream of the equalizer EQ. The input signal of the $$\frac{T}{2} - \text{equalizer}$$

EQ is formed by the difference between the reception signal and the echo signal generated by the echo compensator EC.

Accordingly, the implementation complexity in particular of the echo compensator EC is thus literally twice as great when using a $$\frac{T}{2} - \text{equalizer}$$

EQ instead of a T-equalizer. When using a $$\frac{T}{2} - \text{equalizer}$$

EQ, the echo compensator EC has to calculate twice the number of echo values so that the number of coefficients implemented within the echo compensator EC is doubled in comparison with an echo compensator EC within a transceiver having a T-equalizer.

Consequently, the overall implementation complexity of a transceiver having a $$\frac{T}{2} - \text{equalizer}$$

is considerably greater than that of a transceiver including the T-equalizer EQ. An echo compensator EC is a complex circuit comprising typically 150 coefficients. When using the $$\frac{T}{2} - \text{equalizer},$$

the number of more than 150 coefficients has to be doubled to more than 300 coefficients, thus increasing the overall implementation complexity of the transceiver considerably.

Because of this reason conventional transceivers included T-equalizers EQ although they diminish the performance of the transceiver.

SUMMARY OF THE INVENTION

Accordingly, the object of the present invention is to provide a fractional spaced equalizer for equalizing a reception signal which increases the performance of the transceiver without increasing the implementation complexity in particular of the echo compensator EC within the transceiver.

This object is achieved by a fractional spaced equalizer FSEQ having the features of main claim 1.

The invention provides a fractional spaced equalizer having adjustable coefficients for equalizing a reception signal of a transceiver, wherein said transceiver comprises an echo compensator which generates an echo compensation signal for compensating an echo signal of said transceiver, wherein said echo compensation signal is subtracted from said reception signal equalized by said fractional spaced equalizer by means of a subtractor and wherein the adjustable coefficients of said fractional spaced equalizer are set after a half-duplex training phase of said transceiver during which said echo compensator is deactivated.

In a preferred embodiment of the fractional spaced equalizer according to the invention, an output of the subtractor is connected to a linear equalizer EQ having adjustable coefficients for further equalizing the reception signal of said transceiver.

In a preferred embodiment of the fractional spaced equalizer according to the present invention, said linear equalizer is switchable between a T-mode wherein the linear equalizer EQ operates at a symbol frequency $f_T$ and a $$\frac{T}{2} - \text{mode}$$

wherein the linear equalizer EQ operates at twice the symbol frequency.

In a preferred embodiment of the fractional spaced equalizer according to the present invention, the coefficients of said linear equalizer EQ are adjusted after the linear equalizer has been switched to the $$\frac{T}{2} - \text{mode}$$

during said half-duplex training of said transceiver while said echo compensator EC and said fractional spaced equalizer are deactivated.

In a preferred embodiment of the fractional spaced equalizer according to the present invention, the adjusted coefficients of said linear equalizer EQ are copied by means of an interface to said fractional spaced equalizer FSEQ to set the adjustable coefficients $c_i$ of said fractional spaced equalizer FSEQ.

In a preferred embodiment of the fractional spaced equalizer according to the present invention, the linear equalizer EQ is switched back to the T-mode and the coefficients $d_i$ of said linear equalizer are reset to a start coefficient set after they have been copied by means of said interface to said fractional spaced equalizer FSEQ.

In a preferred embodiment of the fractional spaced equalizer according to the present invention, the coefficients of said linear equalizer EQ are adjusted in said T-mode during a full-duplex training phase of said transceiver after the echo compensator EC and the fractional spaced equalizer have been activated.

In a preferred embodiment of the fractional spaced equalizer according to the present invention, the activated fractional spaced equalizer FSEQ operates at twice the symbol frequency as a $$\frac{T}{2} - \text{equalizer}.$$

In a preferred embodiment of the fractional spaced equalizer according to the present invention, the transceiver transmits and receives data in a data transmission phase via a data transmission channel after the coefficients $d_i$ of said linear equalizer EQ have been adjusted during said full-duplex training phase.

In a preferred embodiment of the fractional spaced equalizer according to the present invention, the transceiver is a SHDSL transceiver.

In a preferred embodiment of the fractional spaced equalizer according to the present invention, the fractional spaced equalizer operates during the data transmission phase at twice the symbol frequency as a $$\frac{T}{2} - \text{equalizer}$$

and operates at a symbol frequency as a T-equalizer in said T-mode.

In a preferred embodiment of the fractional spaced equalizer according to the present invention, the fractional spaced equalizer comprises a decimation means for performing a frequency decimation.

In a preferred embodiment of the fractional spaced equalizer according to the present invention, the fractional spaced equalizer receives interpolated data symbols from an interpolation unit which interpolates data samples generated by an analog-digital converter operating at a predetermined oversampling frequency.

In a preferred embodiment of the fractional spaced equalizer according to the present invention, the sampling phase of said interpolation unit is regulated by a clock recovery unit to synchronize the sampling frequency to a transmitter symbol frequency $f_S$.

In a preferred embodiment of the fractional spaced equalizer according to the present invention, the linear equalizer EQ is connected to a decision unit DEC which generates reception data depending on the equalized reception signal output by said linear equalizer.

In a preferred embodiment of the fractional spaced equalizer according to the present invention, the decision unit DEC is connected to a decision feedback equalizer DFEQ operating at symbol frequency as a T-equalizer.

In a preferred embodiment of the fractional spaced equalizer according to the present invention, the decision unit DEC is connected to a timing error detection unit which generates a phase control criterium supplied to said clock recovery unit.

The invention further provides a method for setting coefficients $c_i$ of a fractional spaced equalizer provided within the transceiver for equalizing a reception signal wherein the method comprises the following steps:

(a) switching a linear equalizer EQ of said transceiver to a $$\frac{T}{2} - \text{Mode}$$

so that the linear equalizer EQ operates at twice a symbol frequency $2f_T$;

(b) deactivating an echo compensator EC of said transceiver and deactivating said fractional spaced equalizer FSEQ;

(c) adjusting coefficients $d_i$ of said linear equalizer EQ in said $$\frac{T}{2} - \text{mode}$$

during a half-duplex training phase while said echo compensator EC and said fractional spaced equalizer are deactivated; and (d) copying the adjusted coefficients $d_i$ of said linear equalizer EQ via an interface to said fractional spaced equalizer FSEQ to set the coefficients $c_i$ of said fractional spaced equalizer FSEQ.

BRIEF DESCRIPTION OF THE DRAWINGS

FIG. 4 shows a timing diagram of a training phase as used by conventional transceivers according to the state of the art;

FIG. 9 shows diagrams for illustrating the performance of an adaptive T-equalizer according to the state of the art without the provision of a fractional spaced equalizer according to the present invention;

FIG. 10 shows diagrams for illustrating the performance of an adaptive T-equalizer with the provision of a fractional spaced equalizer according to the present invention;

FIG. 12 shows diagrams to illustrate the performance of an adaptive T-equalizer according to the state of the art with excess frequency range without the use of a fractional spaced equalizer according to the present invention;

FIG. 13 shows diagrams to illustrate the performance of an adaptive T-equalizer with the provision of a fractional spaced equalizer according to the present invention for a system with excess bandwidth;

DETAILED DESCRIPTION OF THE INVENTION

The invention will now be described with reference to the attached drawings.

Figure 5:
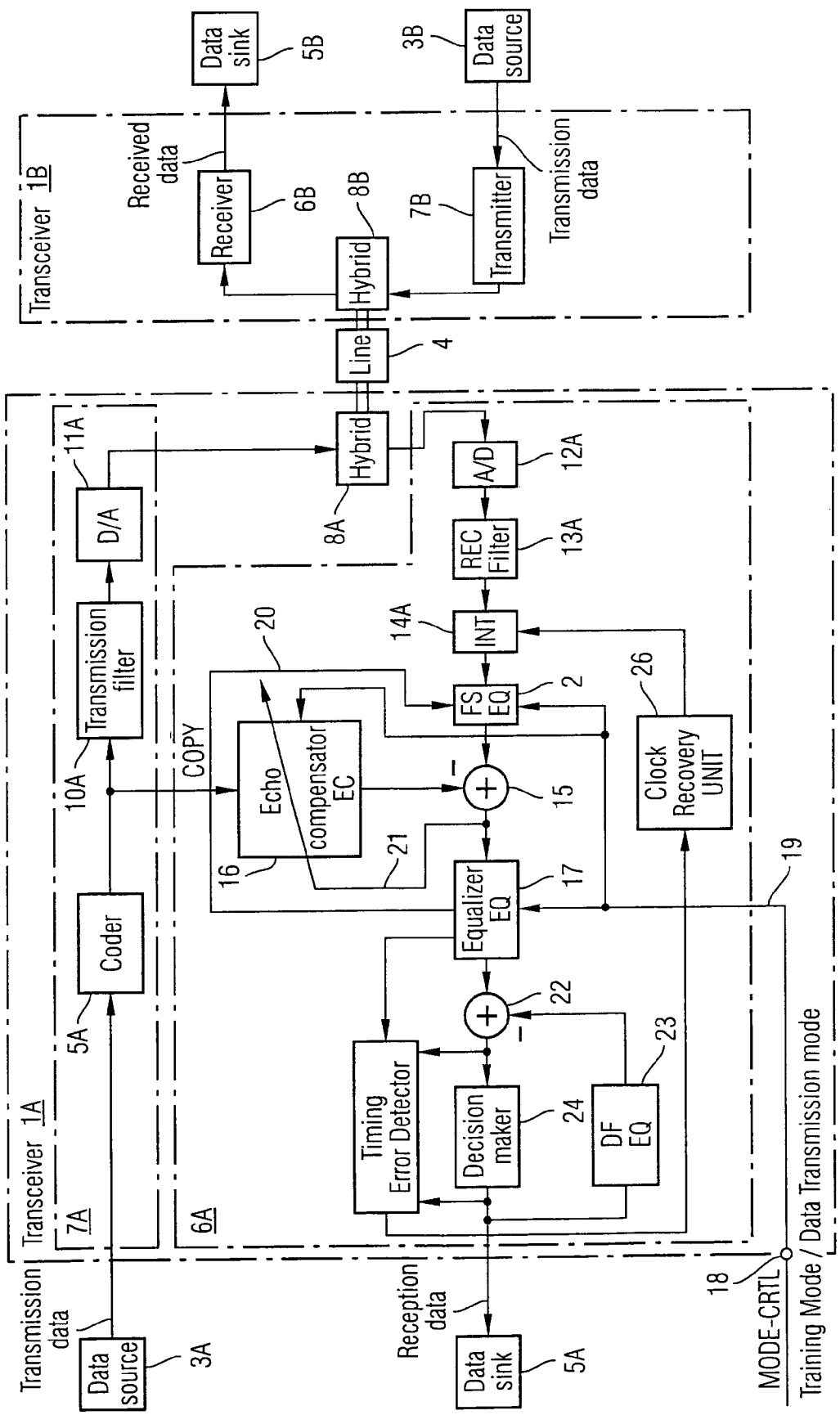
FIG. 5 shows a block diagram of a data transmission system comprising transceivers which include a fractional spaced equalizer FSEQ according to the present invention.

FIG. 5 shows a data transmission system with two transceivers $1a$, $1b$ including a fractional spaced equalizer 2 according to the present invention. Each transceiver $1a$, $1b$ is connected to a corresponding data source $3a$, $3b$ from which it is supplied with data to be transmitted via data transmission channel 4. As shown in FIG. 5, the data transmission channel 4 is formed by a data transmission line. In alternative embodiments, the data transmission channel 4 is a wireless data transmission channel. Both transceivers $1a$, $1b$ are further connected to a corresponding data sink $5a$, $5b$. Each transceiver $1a$, $1b$ comprises a receiver $6a$, $6b$ and a transmitter $7a$, $7b$. The receiver $6a$ and the transmitter $7a$ of the transceiver $1a$ are shown in more detail in FIG. 5. The receiver and the transmitter are both connected to a hybrid circuit 8.

As can be seen from FIG. 5, the transmitter within each transceiver comprises an encoder 9 for encoding the transmission data, a transmission filter 10 and a digital-analog converter 11. The output of the digital-analog converter 11 is connected to the hybrid circuit 8 of the transceiver 1. The analog reception signal received by the transceiver is forwarded by the hybrid circuit 8 to the receiver 6 comprising an analog-digital converter 12. The analog-digital converter 12 performs an oversampling of the received analog signal at a sampling frequency which is much higher than the symbol frequency $f_T$ of the transceiver. The oversampled digital signal is filtered by a reception filter 13 connected to the output of the analog-digital converter 12. The filtered signal is forwarded to an interpolator 14 within the receiver 6. The interpolator circuit 14 performs an interpolation and calculates an interpolated value as explained in connection with FIG. 2. The interpolation unit 14 interpolates data samples generated by the analog-digital converter 12 operating at the predetermined oversampling frequency and outputs the interpolated data symbols to a fractional spaced equalizer 2 according to the present invention.

The fractional spaced equalizer 2 according to the present invention comprises adjustable coefficients $c_i$ for equalizing the received interpolated reception signal. The output signal of the fractional spaced equalizer 2 is supplied to a subtractor 15 which subtracts the echo compensation signal generated by an echo compensator 16 from the equalized signal output by the fractional spaced equalizer 2. A difference signal generated by the subtractor 15 is supplied to a linear equalizer 17 which is switchable between a T-mode and a $$\frac{T}{2} - \text{mode.}$$

Figure 1:
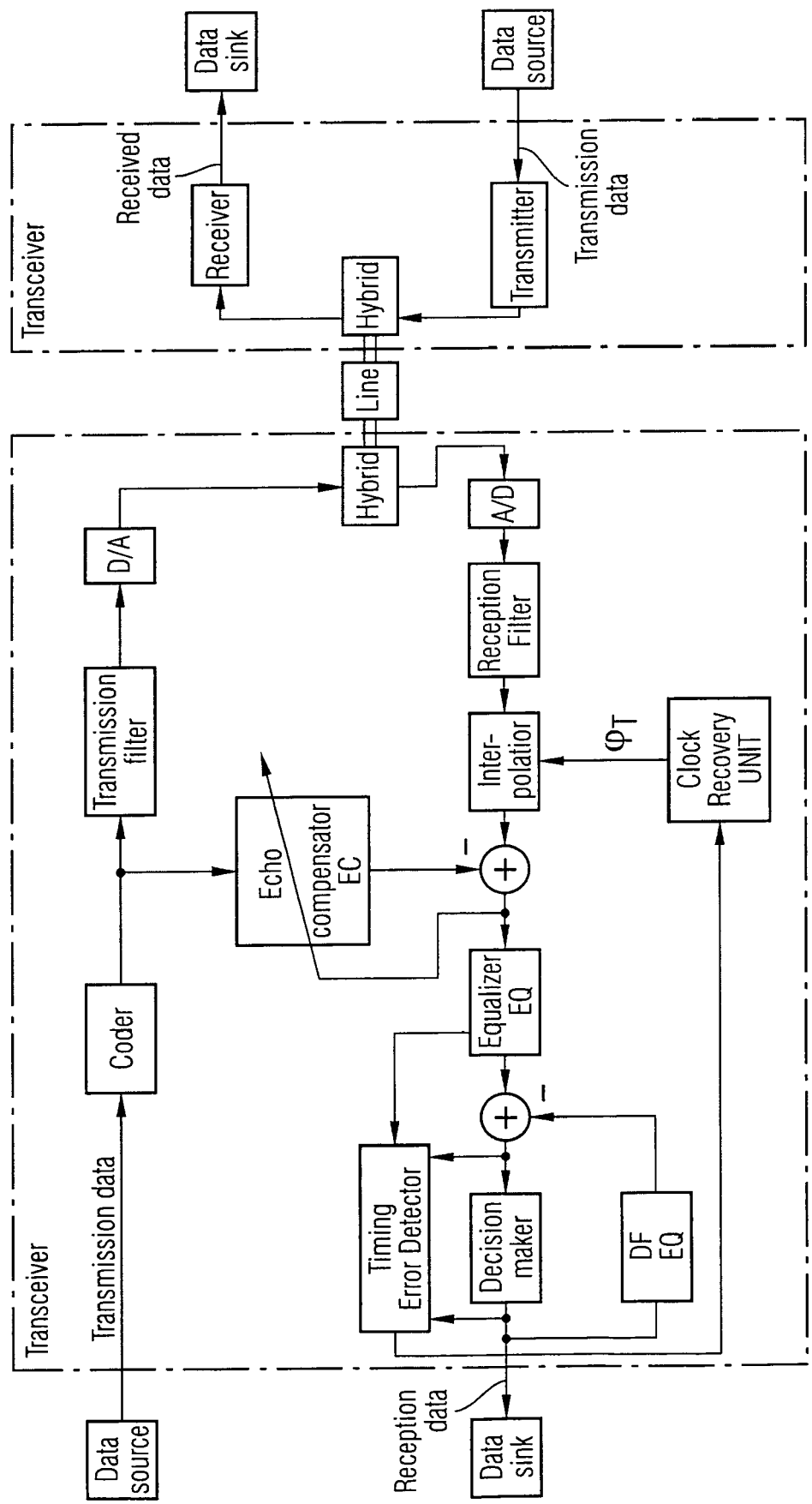
FIG. 1 shows a data transmission system according to the state of the art.
Figure 2:
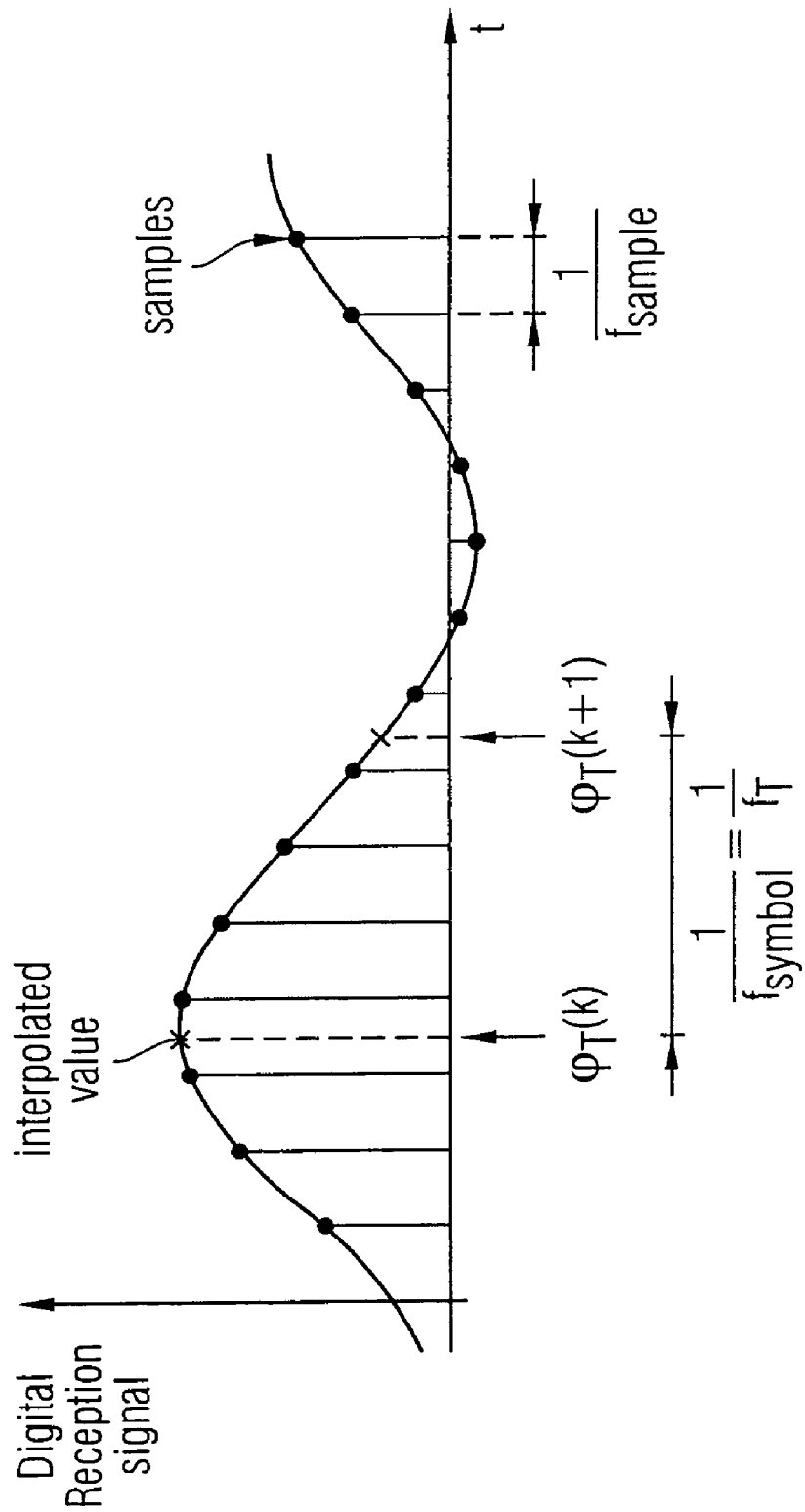
FIG. 2 shows a timing diagram of a digital reception signal according to the state of the art.
Figure 3A:
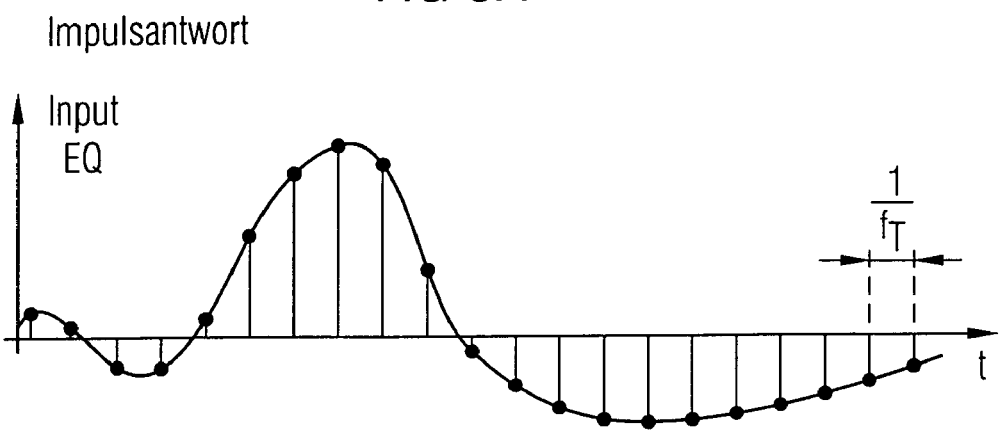
FIG. 3 shows impulse responses at the input and the output of the equalizer within a conventional transceiver according to the state of the art.
Figure 3B:
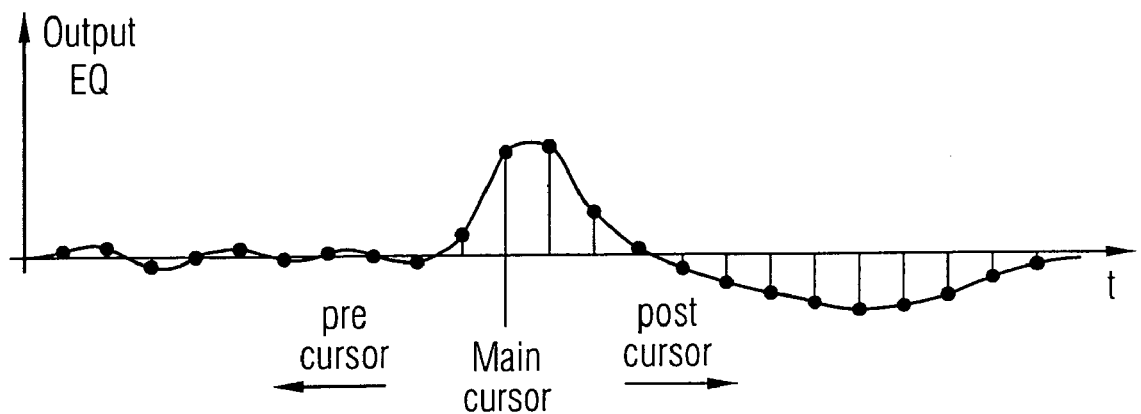
Figure 3C:
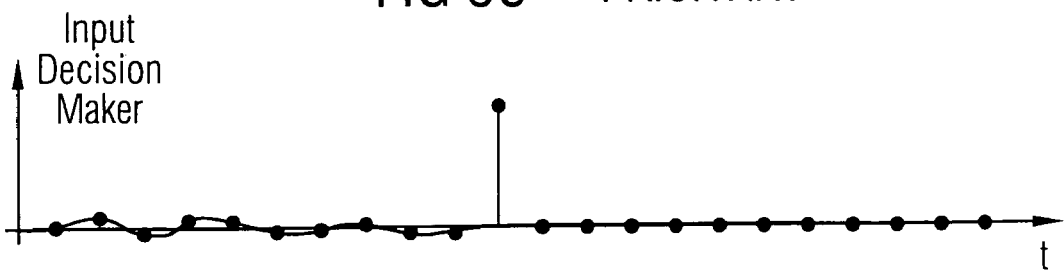

In the T-mode, the linear equalizer 17 operates at symbol frequency $f_T$, and in the $$\frac{T}{2} - \text{mode,}$$

the liner equalizer 17 operates at twice the symbol frequency $f_T$. Switching between the two modes is performed in response to a mode control signal applied to the linear equalizer 17 and to the fractional spaced equalizer 2 via a control input 18 of said transceiver 1. The mode control signal is supplied to the transceiver 1 by a higher layer and supplied to the equalizer 17 and the fractional spaced equalizer 2 via control line 19 as shown in FIG. 5. The linear equalizer 17 is connected to the fractional spaced equalizer 2 by means of an interface 20. The filtered coefficients of the echo compensator 16 are adjustable depending on the difference signal of the subtractor 15 via control lines 21. The output of the linear equalizer 17 is connected to a second subtractor 22 which subtracts the output signal of a decision feedback equalizer 23 from the output signal of the linear equalizer 17. The difference signal of the second subtractor 22 is forwarded to a decision unit 24 which evaluates the received values by comparison with threshold values. A decision unit 24 is connected to a timing error detection unit 25 which generates a phase control criterium signal supplied to a clock recovery unit 26. The interpolation unit 14 is regulated by the clock recovery unit 26 to synchronize the sampling frequency to transmit a symbol frequency as shown in FIG. 2. Finally, the output signal of the decision unit 24 is output to the data sink 5.

Figure 6:
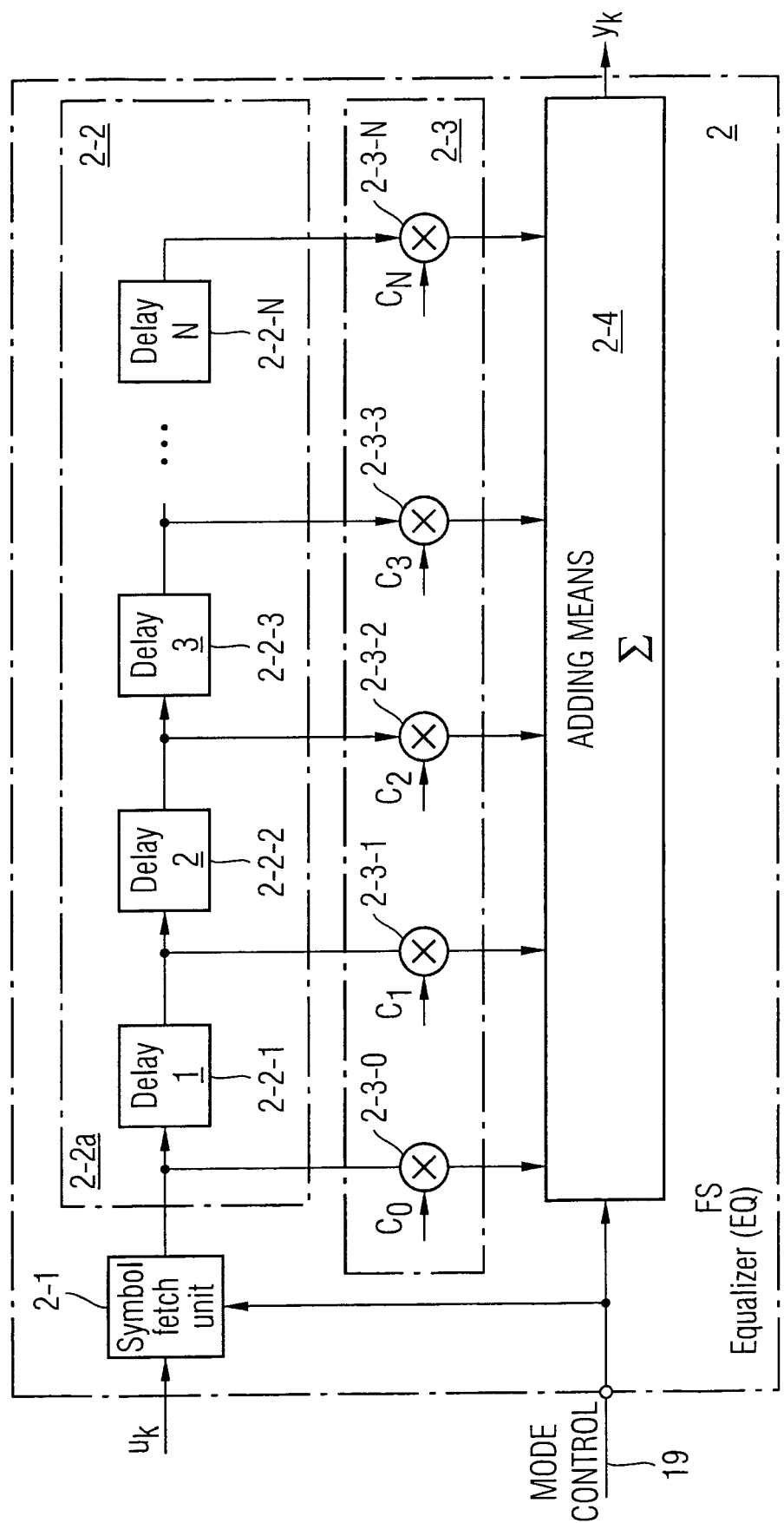
FIG. 6 shows a circuit diagram of a switchable equalizer EQ as employed by a transceiver according to the present invention.

FIG. 6 shows a circuit diagram of the preferred embodiment of the fractional spaced equalizer 2 according to the present invention. The fractional spaced equalizer 2 comprises a symbol fetch unit 2-1 for fetching the data symbol, i.e. interpolated values, from the interpolator 14. The output of the symbol fetch unit 2-1 is connected to a delay element chain 2-2 comprising N delay elements. The output of the symbol fetch unit 2-1 and the output of each delay element of the delay chain 2-2 is connected to a corresponding multiplicator of a multiplicator array 2-3. Each multiplicator 2-3-i multiplies the output signal of a delay element with a corresponding adjustable coefficient $c_i$ and outputs the result to adding means 2-4 within the fractional spaced equalizer 2. The symbol fetch unit 2-1 and the adding means 2-4 are controlled in response to the mode control signal applied via control line 19. The fractional spaced equalizer 2 as shown in FIG. 6 is switchable between a T-mode wherein it operates at symbol frequency $f_T$ and a $$\frac{T}{2} - \text{mode}$$

wherein the equalizer operates at twice the symbol frequency $2f_T$. In the $$\frac{T}{2} - \text{mode,}$$

the symbol fetch unit 2-1 fetches two values from the interpolation unit 14. At the output side of the adding means 2-4, the fractional spaced equalizer 2 comprises decimation means for performing a frequency decimation in the $$\frac{T}{2} - \text{mode.}$$

The number N of the filter coefficients $c_i$ provided within the fractional spaced equalizer 2 according to the present invention depends on the respective application of the transceiver.

Figure 7:
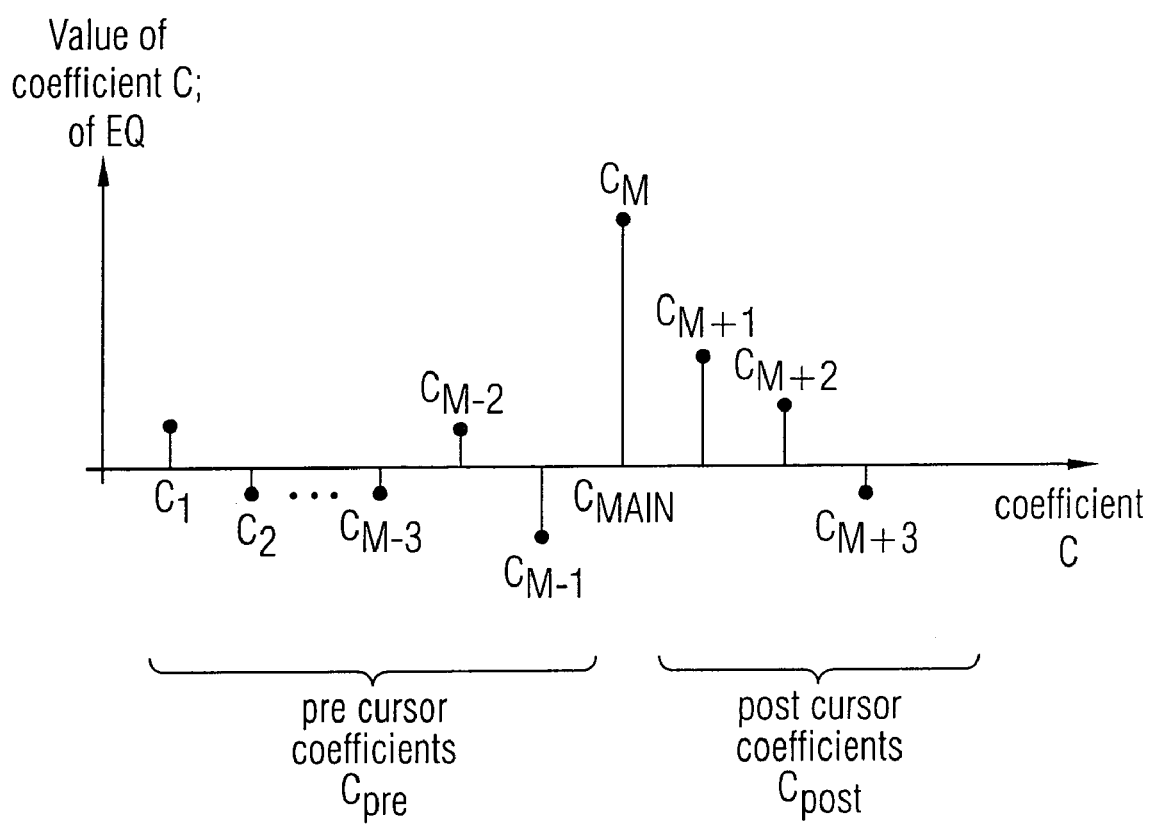
FIG. 7 shows a diagram of the filter coefficients $c_i$ used in the equalizer shown in FIG. 6.

FIG. 7 shows the impulse response, i.e. filter coefficients $c_i$ of the linear equalizer 17 as used in the transceiver according to the present invention. The filter coefficients with the highest value is the so-called main value. The main value is followed by postcursor coefficients $c_{post}$. In front of the main value, the precursor coefficients $c_{pre}$ are located.

Figure 8:
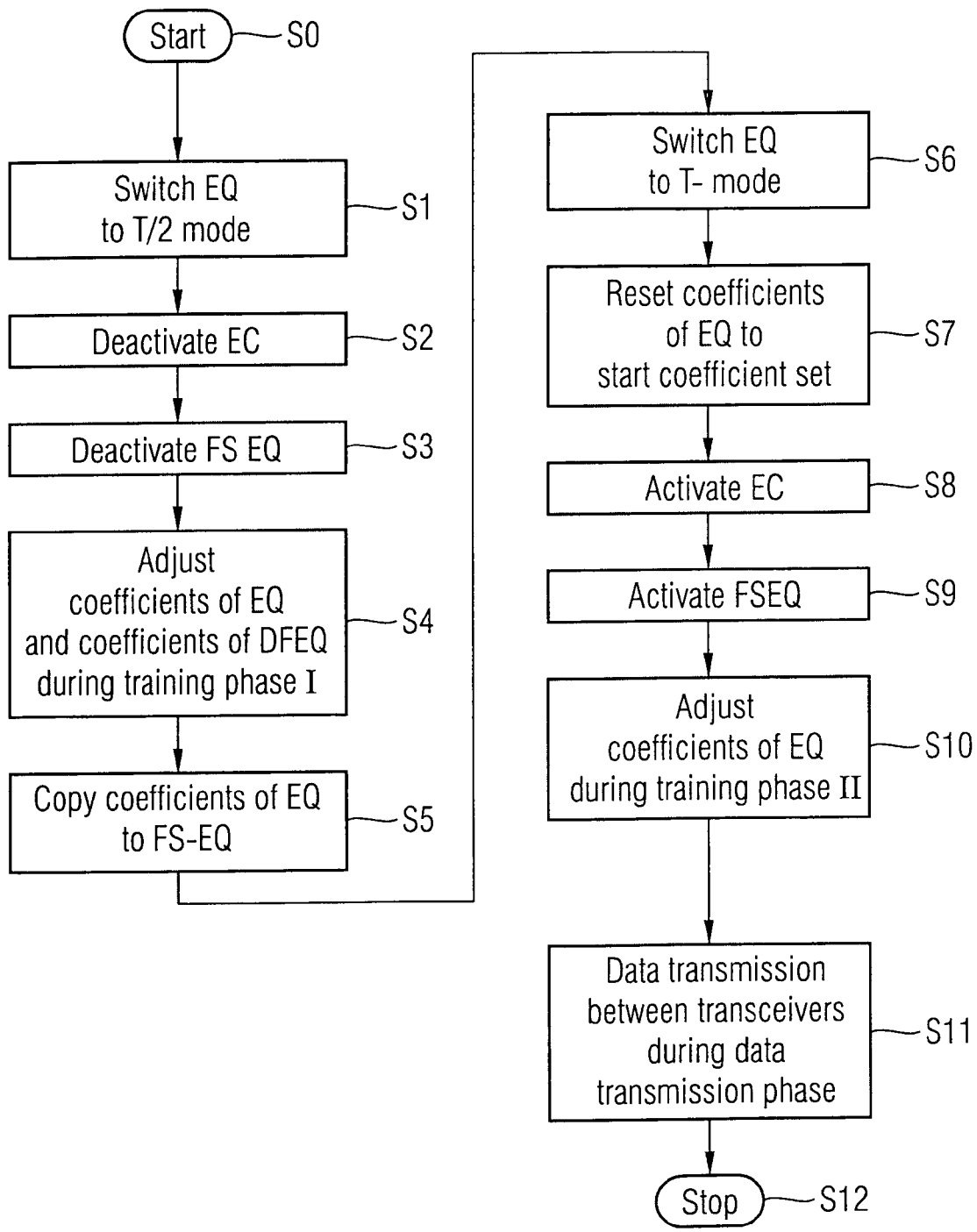
FIG. 8 shows a flowchart of a preferred embodiment of a method for setting coefficients of a fractional spaced equalizer FSEQ according to the present invention.

FIG. 8 shows the preferred embodiment of the method for setting the coefficients $c_i$ of the fractional spaced equalizer 2 according to the present invention. After a starting step S0, the linear equalizer 17 of the transceiver 1 as shown in FIG. 5 is switched in response to the mode control signal to a $$\frac{T}{2} - \text{mode.}$$

The linear equalizer 17 is formed in a preferred embodiment similar to the fractional spaced equalizer as shown in FIG. 6. In the $$\frac{T}{2} - \text{mode,}$$

the linear equalizer 17 operates at twice the symbol frequency $f_T$.

In a further step S2, the echo compensator 16 is deactivated in response to the mode control signal.

Further, in a step S3, the fractional spaced equalizer 2 according to the present invention is also deactivated.

In a step S4, the filter coefficients of the linear equalizer 17 operating the $$\frac{T}{2} - \text{mode}$$

and the filter coefficients of the decision feedback equalizer 23 are adjusted during a half-duplex training phase, i.e. training phase I as shown in FIG. 4, while the echo compensator 16 and the fractional spaced equalizer 2 according to the present invention are deactivated.

In a step S5, the adjusted filter coefficients of the linear equalizer 17 are copied via the interface 20 to the fractional spaced equalizer 2 to set the filter coefficients $c_i$ of the fractional spaced equalizer 2.

After the filter coefficients have been copied from the linear equalizer 17 to the fractional spaced equalizer 2 according to the present invention, the linear equalizer is switched from the $$\frac{T}{2} - \text{Mode}$$

to a T-Mode in step S6.

In a step S7, the filter coefficients of the linear equalizer 17 are reset to a start coefficient set for preparing the linear equalizer 17 for a further adjustment of the filter coefficients. In a preferred embodiment, all filter coefficients of the linear equalizer 17 are reset to zero with the exception of the main coefficient which is set to one.

In a step S8, the echo compensator 16 is activated in response to a mode control signal.

In a step S9, the fractional spaced equalizer 2 is also activated wherein the fractional spaced equalizer 2 comprises filter coefficients which have been copied via the interface 20.

In a step S10, the filter coefficients of the reset linear equalizer 17 are adjusted again during the full-duplex training phase II as shown in FIG. 4.

After the training phase has been completed, the data between both transceivers 1a, 1b are transmitted bidirectional in a data transmission phase, i.e. in a full-duplex mode in step S11.

The procedure stops in step S12.

As can be seen from FIG. 8, the linear equalizer 17 is used during a first training phase I in a half-duplex mode of the transceiver during which the linear equalizer is switched to a $$\frac{T}{2} - \text{mode}$$

to find a coefficient set for the fractional spaced equalizer 2 according to the present invention. After the coefficients of the linear equalizer 17 have been adjusted, they are copied to the fractional spaced equalizer 2 in step S5.

After the coefficients of the fractional spaced equalizer 2 have been set, the equalizer 17 is reset in step S7 and its filter coefficients are adjusted again with an activated echo compensator 16 and an activated fractional spaced equalizer 2 to adjust the linear equalizer 17 itself for the following data transmission.

During the half-duplex training phase I, the receiver 6 of the transceiver 1 at the remote end receives only a transmission signal from the transceiver located at the opposite end of the data transmission line 4, but not its own echo signal. The training signal during training phase I can therefore be used according to the present invention not only for setting the components at the transmission end, but also those of the transceiver at the receiving end.

Since the transceiver at the opposite end of the transmission line no longer requires the echo compensator 16, the fractional spaced equalizer 2 is reconfigured as a $$\frac{T}{2} - \text{equalizer}$$

by copying the coefficients from the linear equalizer 17 after training phase I has been completed. This is performed without any major additional implementation complexity, since the number of coefficients within the equalizers remains unchanged. Two new data sample values are emitted to the equalizer and are processed in each symbol interval. An increase in the sampling rate at the input of the fractional spaced equalizer 2 generally does not involve any increase in the complexity, since the reception filter 13 generally operates at a higher sampling frequency in any case.

The behavior of the fractional spaced equalizer 2 according to the present invention will now be discussed in more detail with reference to FIGS. 9 to 13.

FIG. 9 shows the signal-to-noise ratio and the coefficient values of an adaptive T-equalizer according to the state of the art for different data transmission lines A, B, C. The signal-to-noise ratio SNR is shown as a function of the sampling phase $\phi$ without the use of the fractional spaced equalizer 2 according to the present invention. As can be seen from FIG. 9, the signal-to-noise ratio SNR which results downstream the linear equalizer for the three different lines A, B, C is subjected to white noise interference. Further, the profile of the first precursor equalizer coefficients $c_{n-1}$, i.e. the first equalizer coefficient before the main value, is illustrated for two cases, i.e. with postcursor coefficients ($c_{post-i} \neq 0$) and without postcursor coefficients ($c_{post-i} = 0$). The optimal sampling phase $\phi_{Topt}$ is given at the maximum of the signal-to-noise ratio SNR. The sampling phase $\phi$ generated by the clock recovery unit is not optimal so that a phase difference $\Delta\phi$ is given. In order to control the sampling phase, the reference value for the first precursor coefficient $c_{n-1}$ is determined with the postcursor coefficients being set to zero. Once the synchronization has been carried out, the optimum coefficients for the equalizer are determined with the sampling phase no longer being changed. The sampling phase $\phi_T$ is thus defined by presetting a reference value for the first precursor coefficient during the synchronization phase without postcursor coefficients. In the given example shown in FIG. 9, this reference value is -0.4. As can be seen from FIG. 9, the phase difference $\Delta\phi$ between the optimum sampling phase $\phi_{Topt}$ and the adjusted sampling phase $\phi_T$ is considerable.

FIG. 10 shows the corresponding signal-to-noise ratios SNR for the same data transmission lines A, B, C and for the same noise for a transceiver comprising a fractional spaced equalizer 2 according to the present invention wherein the filter coefficients of the fractional spaced equalizer 2 have been set iteratively during the training phase. In the shown example, the reference value for the first precursor for controlling the sampling phase is always the value zero $c_{reference}=0$. As can be seen from FIG. 10, in addition to a slightly better signal-to-noise ratio SNR, this also results in less scatter in the sampling phase with respect to the optimum sampling phase $\phi_{Topt}$. While the reference value for the first precursor from controlling the sampling phase $\phi_T$ is determined (in our example -0,4), since this is dependent on the parameters of the transceiver, such as transmission filters and reception filters, the reference value $C_{reference}$ in the arrangement according to the present invention is always zero.

Figure 11A:
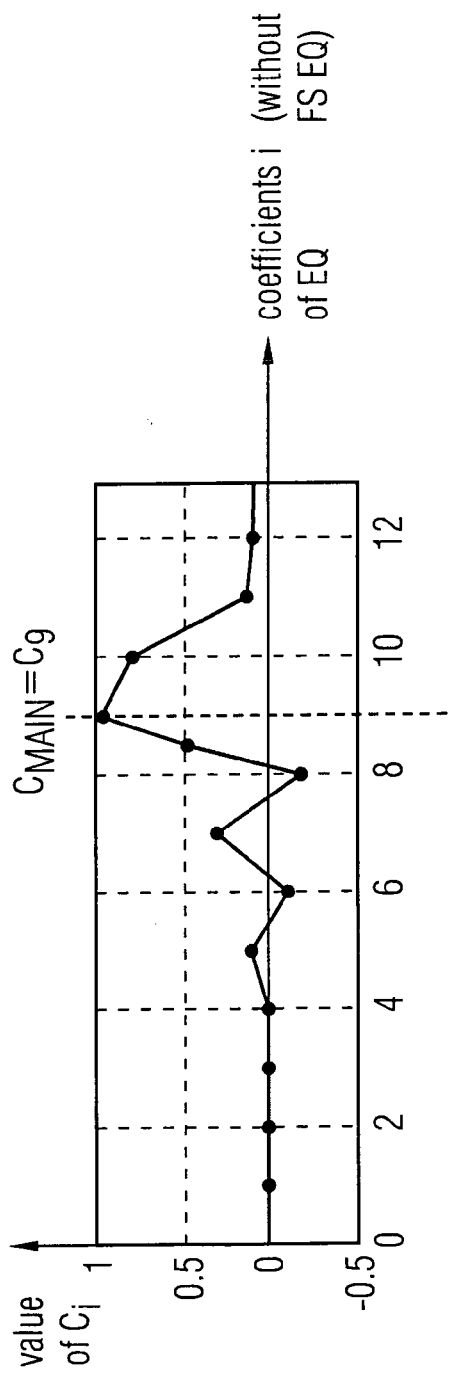
FIG. 11 shows coefficients of a T-equalizer according to the state of the art without the use of a fractional spaced equalizer according to the present invention in comparison with a T-equalizer with the provision of a fractional spaced equalizer according to the present invention.
Figure 11B:
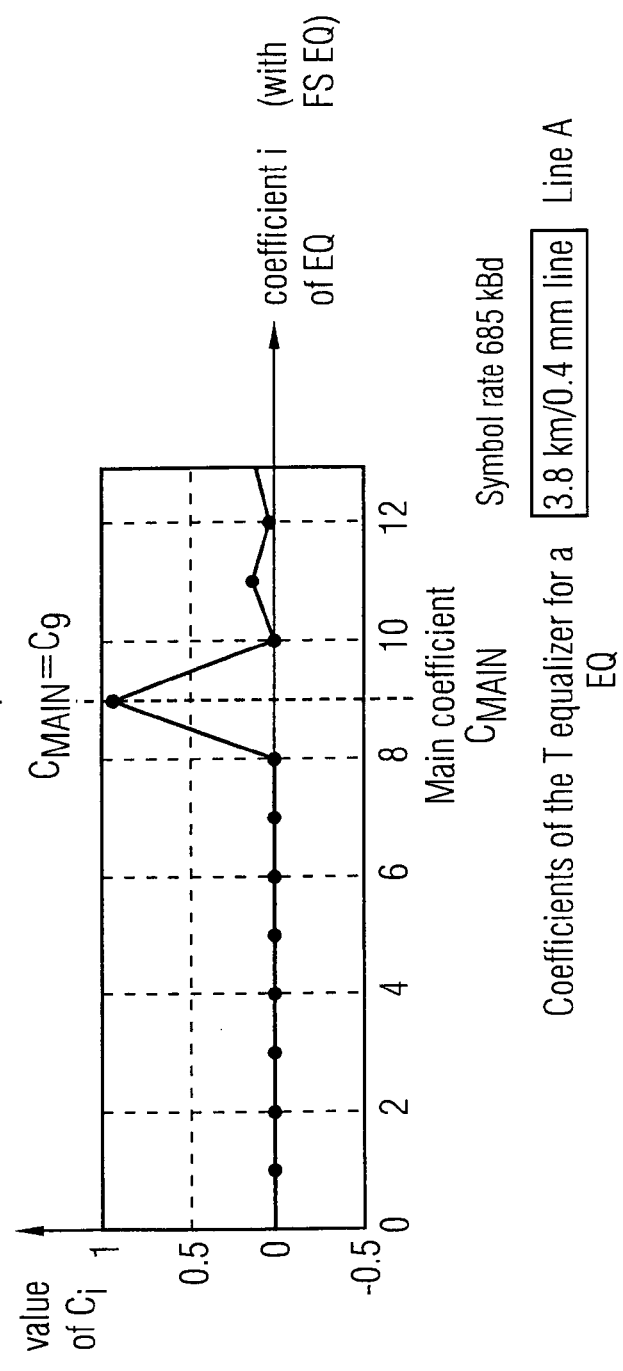

FIG. 11 shows the filter coefficients of the T-equalizer for the data transmission line A. FIG. 11A shows the filter coefficients of the linear equalizer EQ according to the state of the art without the provision of a fractional spaced equalizer 2 according to the present invention. FIG. 11B shows the filter coefficients of the linear equalizer 17 with the provision of an adjusted fractional spaced equalizer 2 according to the present invention. The provision of the fractional spaced equalizer 2 results in a linear equalizer 17 in which the main coefficient $c_m$ dominates and wherein the remaining coefficients are relatively small. In the given example, the main coefficient $c_{main}$ is $c_9$ wherein the precursor coefficients are zero and the postcursor coefficients are small. The input response of the linear equalizer 17 as shown in FIG. 11B is almost ideal and in any case much better than the impulse response of the conventional linear equalizer as shown in FIG. 11A. During operation without the provision of a fractional spaced equalizer 2 as shown in FIG. 11A, there are further precursor and postcursor coefficients which may assume considerable values depending on the line distortion and the noise. Since the equalizer is located within the control loop for setting the coefficients of the echo compensator EC, excessively large equalizer coefficients can influence the Q-factor or even the stability of the echo compensator EC. This is avoided by the provision of the fractional spaced equalizer 2 shown in FIG. 5 which makes it possible that the filter coefficients of the linear equalizer 17 have low values besides the main value.

The behavior of the linear equalizer in a system with excess bandwidth is illustrated in a second example in connection with FIGS. 12, 13. In this case, a transmission spectrum is chosen which is specified for a data rate of 2,3 Mbit/s.

FIG. 12 shows the signal-to-noise ratios SNR as a function of the sampling phase p for a system without the $$\frac{T}{2}$$

fractional spaced equalizer 2, and FIG. 13 shows the same signal-to-noise ratios when using a $$\frac{T}{2}$$

fractional spaced compromise equalizer 2 according to the present invention. In a data transmission system with excess bandwidth, a single precursor coefficient is not sufficient for controlling the sampling phase. In this case, the sum of the first and second precursor coefficients $c_{m-1}+c_{m-2}$ is therefore used for control purposes. The sum of these two precursor coefficients is therefore also shown in FIGS. 12, 13 respectively with and without postcursors.

In both cases, a reference value $c_{ref}=0.2$ is assumed for the sum of the two precursor coefficients. As can be seen from FIG. 12, a considerably greater scatter in the sampling phase with respect to the optimum phase is obtained.

As can be seen from FIG. 13, providing an adaptive T-equalizer with a fractional spaced equalizer 2 according to the present invention in a system with excess frequency range diminishes the sampling phase difference $\Delta\phi$ between the sampling phase and the optimum sampling phase thus increasing the performance of the transceiver.

Figure 14A:
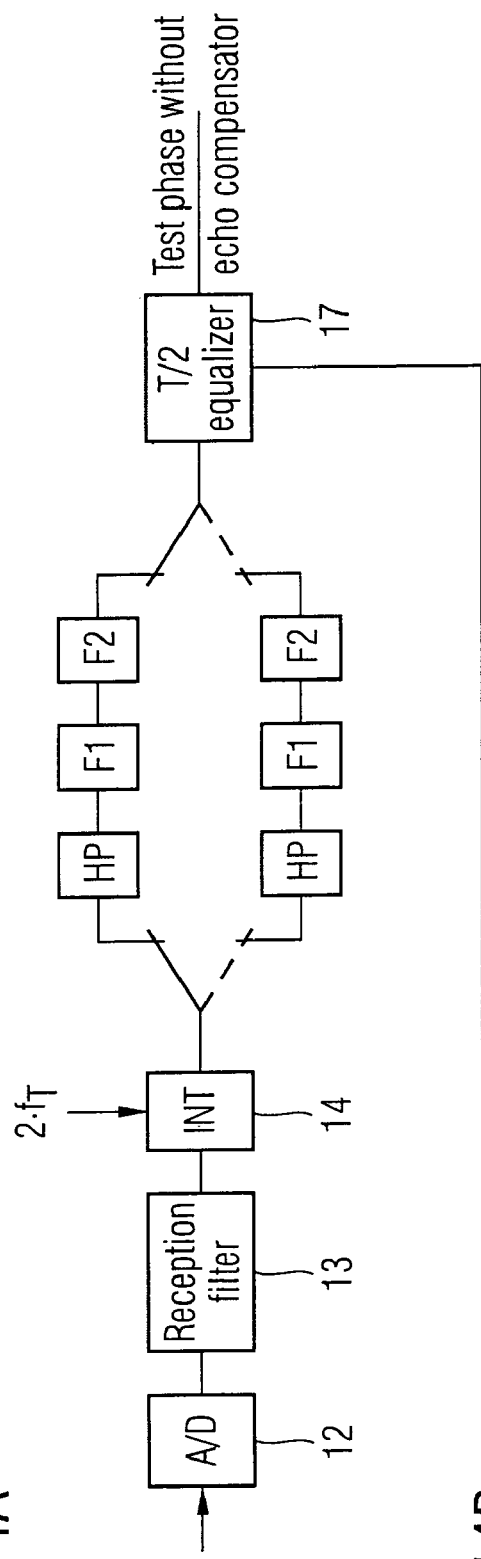
FIG. 14 shows a circuit arrangement of the receiving signal path within a transceiver according to the present invention during a test phase and a data transmission phase.

Finally, a receiver within the transceiver is considered in which there are further filters which operate at the symbol clock rate $f_T$ in addition to the equalizer EQ and the echo compensator EC. The high-pass filter HP and the further filters F1, F2 located upstream to the echo compensator operate in a T-mode. During the half-duplex training phase I, the echo compensator 16 is deactivated and the equalizer 17 is switched to a $$\frac{T}{2} - \text{mode}$$

as can be seen in FIG. 14A.

After digitization at the symbol clock rate, high-pass filtering by means of a high-pass filter HP is generally carried out. Further filters F1, F2 can also be provided, i.e. upstream and downstream of the echo compensator 16. The filter downstream from the echo compensator may vary during the setting-up of the connection in order to simplify or allow synchronization.

As can be seen in FIG. 14a, the filters which operate at the symbol clock rate are duplicated and switching means are provided switching between those signal paths. A signal stream at twice the symbol clock rate is subdivided into two signal streams at the symbol clock rate itself wherein the original signal values in each case are transferred alternately to the two new signal streams. The filtering is carried out in both signal branches using the corresponding identical filters.

The two signal streams are once again combined to form one signal stream to be supplied to the $$\frac{T}{2} - \text{equalizer.}$$

Figure 14B:
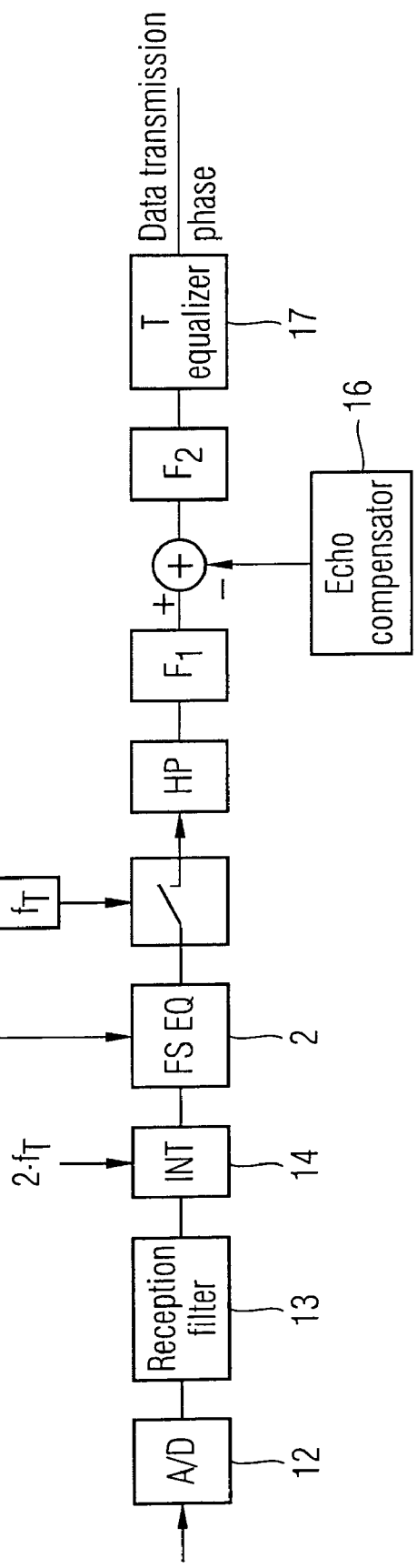

After the completion of the test phase, i.e. training phase, the filter coefficients of the adaptive $$\frac{T}{2} - \text{equalizer}$$

equalizer are once again used as the filter coefficients for the fractional spaced equalizer 2 according to the present invention as shown in FIG. 14B. This is done by copying the filter coefficients of the adjusted $$\frac{T}{2}$$

linear equalizer 17 to the fractional spaced equalizer 2.

In a preferred embodiment, the fractional spaced equalizer 2 is provided within a SHDSL-transceiver 1.

What is claimed is:

1. Fractional Spaced Equalizer having adjustable coefficients for equalizing a reception signal of a transceiver,
    (a) wherein said transceiver comprises an echo compensator which generates an echo compensation signal for compensating an echo signal of said transceiver,
    (b) wherein said echo compensation signal is substracted from said reception signal equalized by said fractional spaced equalizer by means of a substractor, and
    (c) wherein the adjustable coefficients of said fractional spaced equalizer are set after a half-duplex training phase of said transceiver during which said echo compensator is deactivated.

2. The Fractional Spaced Equalizer according to claim 1, wherein an output of said substractor is connected to a linear equalizer having adjustable coefficients for further equalizing the reception signal of said transceiver.

3. The Fractional Spaced Equalizer according to claim 2, wherein said linear equalizer is switchable between a T-Mode wherein the linear equalizer operates at a symbol frequency and a $$\frac{T}{2} - \text{Mode}$$

wherein the linear equalizer operates at twice the symbol frequency.

4. The Fractional Spaced Equalizer according to claim 3, wherein the coefficients of said linear equalizer are adjusted after the linear equalizer has been switched to the $$\frac{T}{2} - \text{Mode}$$

during said half-duplex training of said transceiver while said echo compensator and said fractional spaced equalizer are deactivated.

5. The Fractional Spaced Equalizer according to claim 4, wherein the adjusted coefficients of said linear equalizer are copied by means of an interface to said fractional spaced equalizer to set the adjustable coefficients of said fractional spaced equalizer.

6. The Fractional Spaced Equalizer according to claim 5, wherein the linear equalizer is switched back to the T-Mode and the coefficients of said linear equalizer are reset to a start coefficient set after they have been copied by means of said interface to said fractional spaced equalizer.

7. The Fractional Spaced Equalizer according to claim 6, wherein the coefficients of said linear equalizer are adjusted in said T-Mode during a full-duplex training phase of said transceiver after the echo compensator and the fractional spaced equalizer have been activated.

8. The Fractional Spaced Equalizer according to claim 1, wherein the activated fractional spaced equalizer operates at twice the symbol frequency as a $$\frac{T}{2} - \text{equalizer.}$$

9. The Fractional Spaced Equalizer according to claim 7, wherein the transceiver transmits and receives data in a data transmission phase via a data transmission channel after the coefficients of said linear equalizer have been adjusted during said full-duplex training phase.

10. The Fractional Spaced Equalizer according to claim 1, wherein said transceiver is a SHDSL transceiver.

11. The Fractional Spaced Equalizer according to claim 9, wherein during the data transmission phase the fractional spaced equalizer operates at twice the symbol frequency as a $$\frac{T}{2} - \text{equalizer}$$

and the linear equalizer operates at a symbol frequency as a T-equalizer in said T-Mode.

12. The Fractional Spaced Equalizer according to claim 1, wherein the fractional spaced equalizer comprises decimation means for performing a frequency decimation.

13. The Fractional Spaced Equalizer according to claim 1, wherein the fractional spaced equalizer receives interpolated data symbols from an interpolation unit which interpolates data samples generated by an analog-digital converter operating at a predetermined oversampling frequency.

14. The Fractional Spaced Equalizer according to claim 13, wherein the sampling phase of said interpolation unit is regulated by a clock recovery unit to synchronize the sampling frequency to a transmitter symbol frequency.

15. The Fractional Spaced Equalizer according to claim 2, wherein the linear equalizer is connected to a decision unit of said transceiver which generates reception data depending on the equalized reception signal output by said linear equalizer.

16. The Fractional Spaced Equalizer according to claim 15, wherein the decision unit is connected to a decision feedback equalizer operating at symbol frequency as a T-equalizer.

17. The Fractional Spaced Equalizer according to claim 15, wherein the decision unit is connected to a timing error detection unit which generates a phase control criterium supplied to said clock recovery unit.

18. Method for setting coefficients of a fractional spaced equalizer provided within a transceiver for equalizing a reception signal said method comprising the following steps:
(a) switching a linear equalizer of said transceiver to a $$\frac{T}{2} - \text{Mode}$$

so that the linear equalizer operates at twice a symbol frequency
(b) deactivating an echo compensator of said transceiver and deactivating said fractional spaced equalizer;
(c) adjusting coefficients of said linear equalizer in said $$\frac{T}{2} - \text{Mode}$$

during a half-duplex training phase while said echo compensator and said fractional spaced equalizer are deactivated; and
(d) copying the adjusted coefficients of said linear equalizer via an interface to said fractional spaced equalizer to set the coefficients of said fractional spaced equalizer.

* * * * *